(12) United States Patent
Kobayashi et al.

(10) Patent No.: US 12,506,217 B2
(45) Date of Patent: Dec. 23, 2025

(54) BATTERY MODULE

(71) Applicant: PRIME PLANET ENERGY & SOLUTIONS, INC., Tokyo (JP)

(72) Inventors: Keiichiro Kobayashi, Nisshin (JP); Hiroki Ishii, Kakogawa (JP); Eiji Kawasaki, Kasai (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 605 days.

(21) Appl. No.: 18/084,808

(22) Filed: Dec. 20, 2022

(65) Prior Publication Data
US 2023/0198078 A1 Jun. 22, 2023

(30) Foreign Application Priority Data
Dec. 21, 2021 (JP) .................................. 2021-207169

(51) Int. Cl.
*H01M 50/291* (2021.01)
*H01M 10/04* (2006.01)
(Continued)

(52) U.S. Cl.
CPC ..... *H01M 50/291* (2021.01); *H01M 10/0481* (2013.01); *H01M 10/613* (2015.04); *H01M 10/6556* (2015.04); *H01M 10/6563* (2015.04); *H01M 50/19* (2021.01); *H01M 50/209* (2021.01); *H01M 50/224* (2021.01);
(Continued)

(58) Field of Classification Search
CPC ........... H01M 10/0481; H01M 10/613; H01M 10/6556; H01M 10/6563; H01M 50/19; H01M 50/209; H01M 50/224; H01M 50/227; H01M 50/244; H01M 50/264; H01M 50/291; H01M 50/293; H01M 50/55; Y02E 60/10
See application file for complete search history.

(56) References Cited

U.S. PATENT DOCUMENTS

2012/0003526 A1 1/2012 Kume et al.
2012/0141855 A1 6/2012 Okada et al.
(Continued)

FOREIGN PATENT DOCUMENTS

DE 102020003892 B4 12/2021
JP 2011-023179 2/2011
(Continued)

*Primary Examiner* — Lingwen R Zeng
(74) *Attorney, Agent, or Firm* — Finnegan, Henderson, Farabow, Garrett and Dunner, LLP

(57) ABSTRACT

A protrusion is formed to protrude from a separator to a side opposite to a plurality of battery cells along a second direction. A restraint member includes: a binding bar extending in a first direction; and an abutment member located on the plurality of battery cells side with respect to the binding bar, the abutment member being in abutment with the separator at a first position and a second position to form an air flow path, the first position and the second position being separated from each other along a third direction. The first position is located on a side close to an upper surface of a housing with respect to the second position. The protrusion is disposed only at the second position, and is provided to interfere with the abutment member at the second position so as to compress and deform the abutment member.

17 Claims, 3 Drawing Sheets

(51) Int. Cl.
*H01M 10/613* (2014.01)
*H01M 10/6556* (2014.01)
*H01M 10/6563* (2014.01)
*H01M 50/19* (2021.01)
*H01M 50/209* (2021.01)
*H01M 50/224* (2021.01)
*H01M 50/227* (2021.01)
*H01M 50/244* (2021.01)
*H01M 50/264* (2021.01)
*H01M 50/293* (2021.01)
*H01M 50/55* (2021.01)

(52) U.S. Cl.
CPC ........ *H01M 50/227* (2021.01); *H01M 50/244* (2021.01); *H01M 50/264* (2021.01); *H01M 50/293* (2021.01); *H01M 50/55* (2021.01); *Y02E 60/10* (2013.01)

(56) References Cited

U.S. PATENT DOCUMENTS

| | | |
|---|---|---|
| 2015/0140405 A1 | 5/2015 | Sakurai |
| 2019/0051872 A1 | 2/2019 | Kakimura |
| 2020/0194750 A1 | 6/2020 | Kawano |
| 2020/0243816 A1 | 7/2020 | Terauchi et al. |
| 2021/0288363 A1* | 9/2021 | Okada .................... H01G 11/10 |

FOREIGN PATENT DOCUMENTS

| | | |
|---|---|---|
| JP | 2012-014962 | 1/2012 |
| JP | 2012-123905 | 6/2012 |
| JP | 2014-035970 A | 2/2014 |
| JP | 2015-084331 | 4/2015 |
| JP | 2015-099650 A | 5/2015 |
| JP | 2019-032997 A | 2/2019 |
| JP | 2021-026875 | 2/2021 |
| WO | WO 2018/042763 | 3/2018 |
| WO | WO 2019/021779 A1 | 1/2019 |
| WO | WO 2019/031169 | 2/2019 |

* cited by examiner

BATTERY MODULE

This nonprovisional application is based on Japanese Patent Application No. 2021-207169 filed on Dec. 21, 2021 with the Japan Patent Office, the entire contents of which are hereby incorporated by reference.

BACKGROUND OF THE INVENTION

Field of the Invention

The present technology relates to a battery module.

Description of the Background Art

There has been conventionally known a battery module in which a plurality of battery cells and a separator are stacked and are restrained in the stacking direction by a restraint member so as to form a module. A structure of such a conventional battery module is shown in WO 2018/042763, Japanese Patent Laying-Open No. 2015-084331, Japanese Patent Laying-Open No. 2012-123905, WO 2019/031169, Japanese Patent Laying-Open No. 2011-023179, Japanese Patent Laying-Open No. 2021-026875, Japanese Patent Laying-Open No. 2012-014962, or the like.

Each of the plurality of battery cells in the battery module has electrode terminals each connected to a bus bar or a collective terminal. Each of the electrode terminals has a potential. On the other hand, the restraint member that restrains the plurality of battery cells has a ground potential. Therefore, there is a potential difference between each of the electrode terminals of the battery cells and the restraint member, with the result that they need to be insulated from each other.

Even when dew condensation or the like occurs, it is required to stably secure an insulation property between the electrode terminal and the restraint member. The conventional battery module does not necessarily have a configuration sufficient to address such a problem.

SUMMARY OF THE INVENTION

It is an object of the present technology to provide a battery module in which a stable insulation property can be secured.

A battery module according to the present technology includes: a plurality of battery cells arranged in a first direction; a separator provided between the plurality of battery cells; and a restraint member that restrains the plurality of battery cells in the first direction. Each of the plurality of battery cells includes two electrode terminals arranged side by side along a second direction orthogonal to the first direction, and a housing having an upper surface and a lower surface facing each other along a third direction orthogonal to the first direction and the second direction. The two electrode terminals are provided on the upper surface of the housing. A protrusion is formed to protrude from the separator to a side opposite to the plurality of battery cells along the second direction. The restraint member includes a binding bar extending in the first direction, and an abutment member located on the plurality of battery cells side with respect to the binding bar, the abutment member being in abutment with the separator at a first position and a second position to form an air flow path between the first position and the second position, the first position and the second position being separated from each other along the third direction. The first position is located on a side close to the upper surface of the housing with respect to the second position. The protrusion is disposed only at the second position of the first position and the second position, and is provided to interfere with the abutment member at the second position so as to compress and deform the abutment member.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
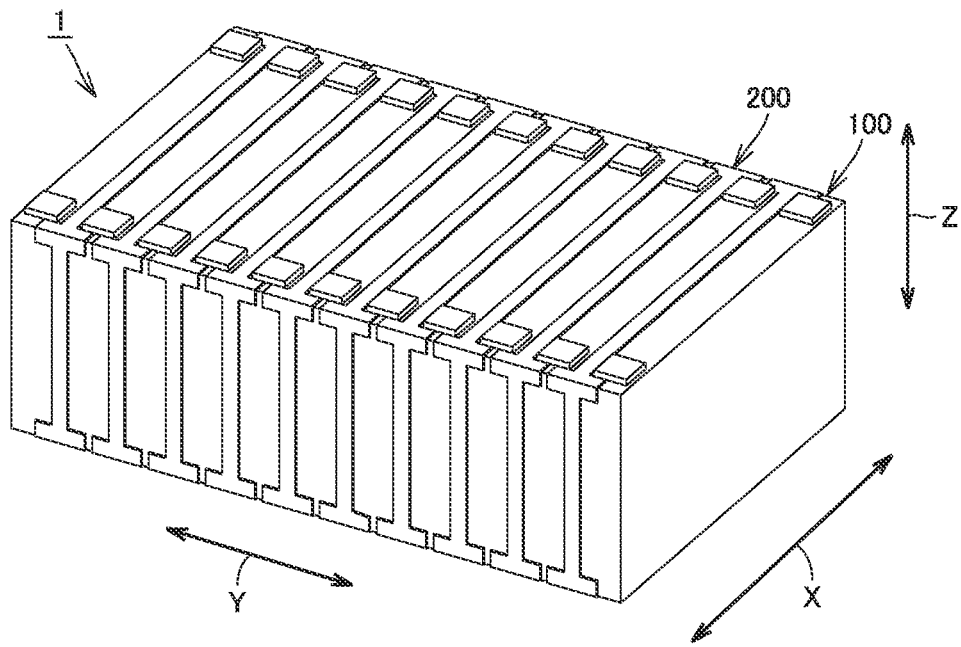
FIG. 1 is a perspective view of a battery module.

Hereinafter, embodiments of the present technology will be described. It should be noted that the same or corresponding portions are denoted by the same reference characters, and may not be described repeatedly.

It should be noted that in the embodiments described below, when reference is made to number, amount, and the like, the scope of the present technology is not necessarily limited to the number, amount, and the like unless otherwise stated particularly. Further, in the embodiments described below, each component is not necessarily essential to the present technology unless otherwise stated particularly. Further, the present technology is not limited to one that necessarily exhibits all the functions and effects stated in the present embodiment.

It should be noted that in the present specification, the terms "comprise", "include", and "have" are open-end terms. That is, when a certain configuration is included, a configuration other than the foregoing configuration may or may not be included.

Also, in the present specification, when geometric terms and terms representing positional/directional relations are used, for example, when terms such as "parallel", "orthogonal", "obliquely at 45°", "coaxial", and "along" are used, these terms permit manufacturing errors or slight fluctuations. In the present specification, when terms representing relative positional relations such as "upper side" and "lower side" are used, each of these terms is used to indicate a relative positional relation in one state, and the relative positional relation may be reversed or turned at any angle in accordance with an installation direction of each mechanism (for example, the entire mechanism is reversed upside down).

In the present specification, the term "battery" is not limited to a lithium ion battery, and may include another battery such as a nickel-metal hydride battery.

FIG. 1 is a perspective view of a battery module 1. As shown in FIG. 1, battery module 1 includes battery cells 100 and separator members 200.

The plurality of battery cells 100 are battery cells each having a prismatic shape, and are provided along a Y axis direction (first direction). Separator members 200 are provided between the plurality of battery cells 100. Each of separator members 200 prevents unintended electrical conduction between adjacent battery cells 100. Separator member 200 secures an electrical insulation property between adjacent battery cells 100.

Figure 2:
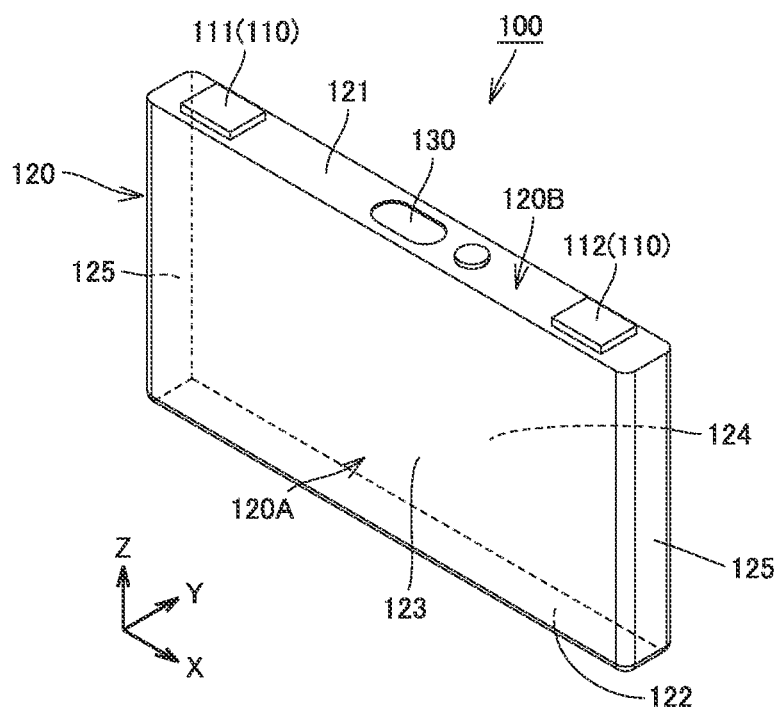
FIG. 2 is a perspective view showing a battery cell included in the battery module.

FIG. 2 is a perspective view showing a battery cell 100. As shown in FIG. 2, battery cell 100 has a prismatic shape. Battery cell 100 has electrode terminals 110, a housing 120, and a gas-discharge valve 130.

Electrode terminals 110 are formed on housing 120. Electrode terminals 110 have a positive electrode terminal 111 and a negative electrode terminal 112 arranged side by side along an X axis direction (second direction) orthogonal to the Y axis direction (first direction). Positive electrode terminal 111 and negative electrode terminal 112 are provided to be separated from each other in the X axis direction.

Housing 120 has a rectangular parallelepiped shape, and forms an external appearance of battery cell 100. Housing 120 includes: a case main body 120A that accommodates an electrode assembly (not shown) and an electrolyte solution (not shown); and a sealing plate 120B that seals an opening of case main body 120A. Sealing plate 120B is joined to case main body 120A by welding.

Housing 120 includes an upper surface 121, a lower surface 122, a first side surface 123, a second side surface 124, and two third side surfaces 125.

Upper surface 121 is a flat surface orthogonal to a Z axis direction (third direction) that is orthogonal to the Y axis direction and the X axis direction. Electrode terminals 110 are disposed on upper surface 121. Lower surface 122 faces upper surface 121 along the Z axial direction.

Each of first side surface 123 and second side surface 124 is constituted of a flat surface orthogonal to the Y axis direction. Each of first side surface 123 and second side surface 124 has the largest area among the areas of the plurality of side surfaces of housing 120. Each of first side surface 123 and second side surface 124 has a rectangular shape when viewed in the Y axis direction. Each of first side surface 123 and second side surface 124 has a rectangular shape in which the X axis direction corresponds to the long-side direction and the Z axis direction corresponds to the short-side direction when viewed in the Y axis direction.

The plurality of battery cells 100 are stacked such that first side surfaces 123 of battery cells 100, 100 adjacent to each other in the Y direction face each other and second side surfaces 124 of battery cells 100, 100 adjacent to each other in the Y axis direction face each other. Thus, positive electrode terminals 111 and negative electrode terminals 112 are alternately arranged in the Y axis direction in which the plurality of battery cells 100 are stacked.

Gas-discharge valve 130 is provided in upper surface 121. When the temperature of battery cell 100 is increased (thermal runaway) and the internal pressure of housing 120 becomes more than or equal to a predetermined value due to gas generated inside housing 120, gas-discharge valve 130 discharges the gas to the outside of housing 120.

Figure 3:
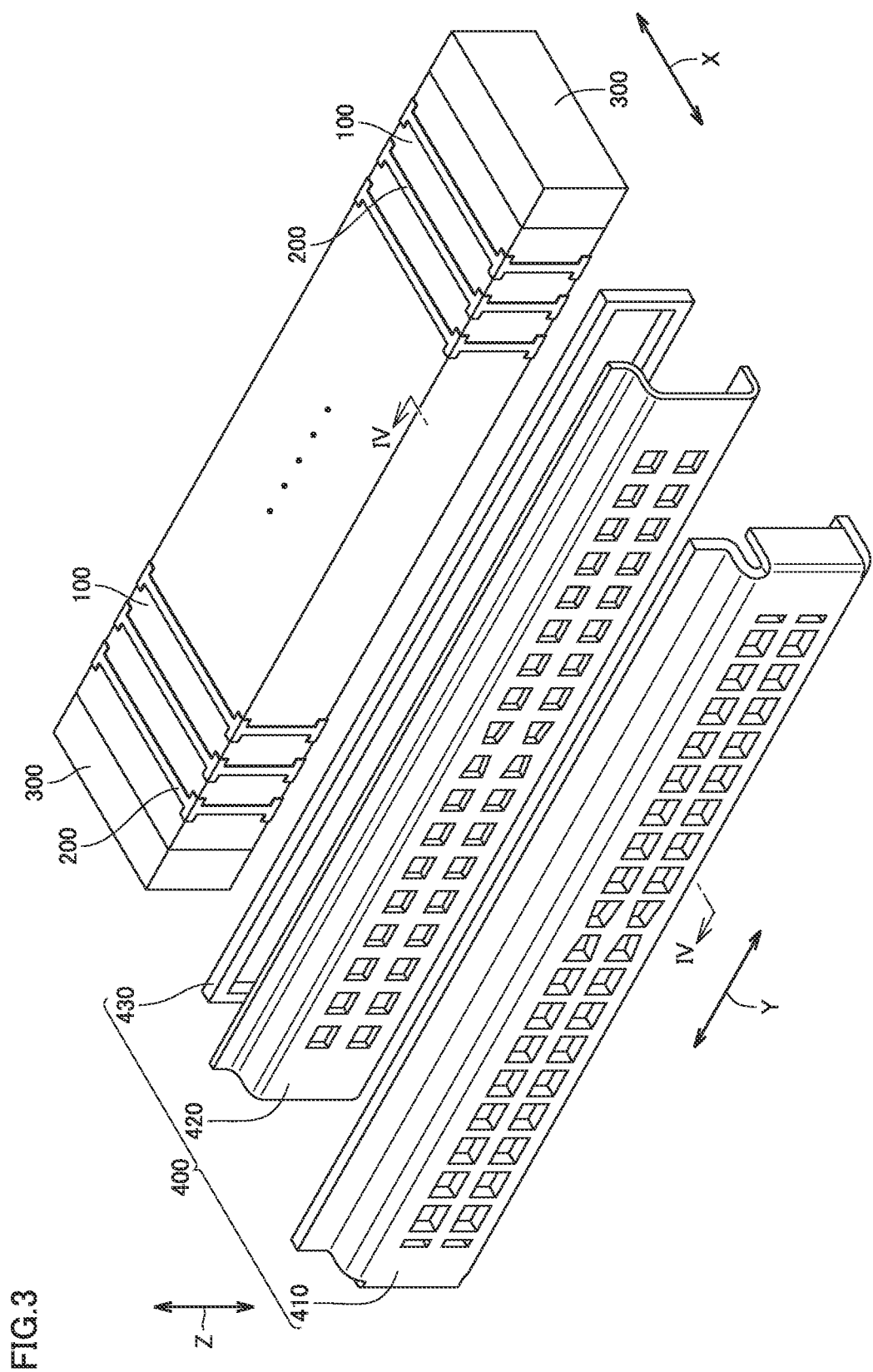
FIG. 3 is an exploded perspective view of a restraint member included in the battery module.

FIG. 3 is an exploded perspective view of a restraint member 400. As shown in FIG. 3, end plates 300 are disposed at the both ends of battery module 1 in the Y axis direction. Each of end plates 300 is fixed to a base such as a case that accommodates battery module 1.

Restraint member 400 connects two end plates 300 to each other. Restraint member 400 is engaged with end plates 300 with compression force in the Y axis direction being exerted to the stack of the plurality of battery cells 100, separator members 200, and end plates 300, and then the compression force is released, with the result that tensile force acts on restraint member 400 that connects two end plates 300 to each other. As a reaction thereto, restraint member 400 presses two end plates 300 in directions of bringing them closer to each other.

Restraint member 400 includes: a binding bar 410 extending in the Y axis direction; and an insulating cover 420 and a sealing member 430 (abutment member) both located on the plurality of battery cells side with respect to binding bar 410.

Binding bar 410 receives a tensile force in the Y axis direction. Binding bar 410 can be composed of a metal such as iron, for example. Insulating cover 420 is provided to secure electrical insulation between battery cell 100 and binding bar 410. Sealing member 430 is provided to form an air flow path between battery cell 100 and binding bar 410.

It should be noted that for convenience of illustration, FIG. 3 illustrates that restraint member 400 is disposed only on one side in the X axis direction with respect to battery cells 100 and end plates 300; however, restraint member 400 is disposed on each of the both sides in the X axis direction with respect to battery cells 100 and end plates 300.

Figure 4:
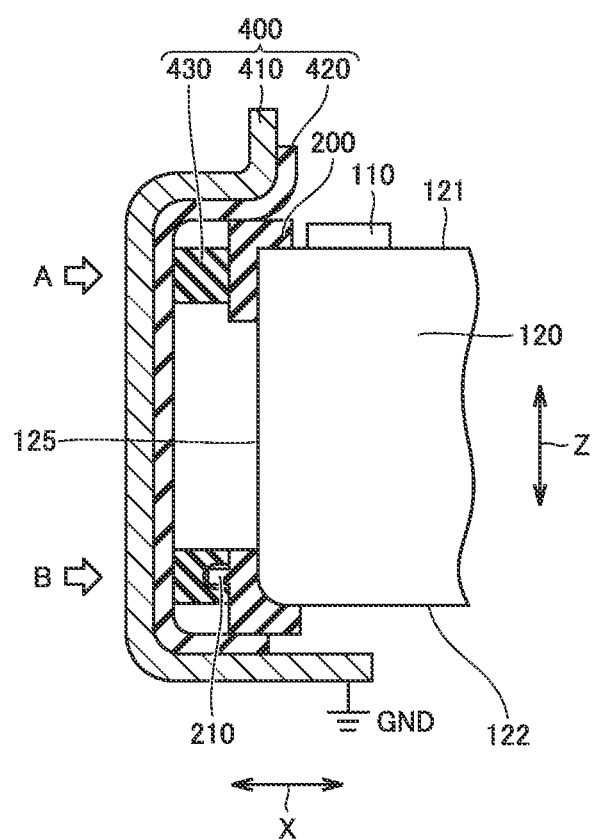
FIG. 4 is a cross sectional view taken along Iv-Iv in FIG. 3.

FIG. 4 is a cross sectional view taken along IV-IV in FIG. 3. As shown in FIG. 4, separator member 200 has a protrusion 210 that protrudes to a side opposite to battery cells 100 along the X axis direction. Protrusion 210 is not limited to one formed in one piece with separator member 200, and may be formed separately from separator member 200. Protrusion 210 is composed of a material harder than that of sealing member 430. Protrusion 210 can be composed of an insulating resin or the like, and can be preferably composed of polypropylene or the like.

Sealing member 430 can be composed of an insulating resin or the like. Preferably, the sealing member can be composed of a material having a water absorption function such as urethane foam. Since sealing member 430 has such a water absorption function, condensed water can be efficiently removed from the vicinity of electrode terminal 110 at the time of occurrence of dew condensation.

Sealing member 430 is in abutment with separator member 200 at a position A (first position) and a position B (second position). Thus, an air flow path sandwiched between battery cell 100 and restraint member 400 can be formed between position A and position B that are separated from each other along the Z axis direction. Air flowing through the air flow path contributes to cooling of battery cell 100.

As shown in FIG. 4, position A is located on a side close to upper surface 121 of housing 120 with respect to position B. Protrusion 210 of separator member 200 is disposed only at position B of position A and position B. At position A, sealing member 430 can be compressed by separator member 200. At position B, protrusion 210 of separator member 200 interferes with sealing member 430. Protrusion 210 is provided to compress and deform sealing member 430. Therefore, sealing member 430 is compressed more strongly at position B than at position A.

Position A is located in the vicinity of upper surface 121 of housing 120, i.e., in the vicinity of a joining portion of sealing plate 120B to case main body 120A. Position B is located in the vicinity of lower surface 122 of housing 120. More specifically, position B is located in the vicinity of a curvature portion adjacent to lower surface 122 of housing 120. Here, the term "vicinity" means a range within about 10 mm from a corresponding position.

In battery module 1, there is a potential difference between electrode terminal 110 of battery cell 100 and binding bar 410 of restraint member 400. In order to insulate them from each other, it is required to suppress formation of an unintended electrical conduction path between electrode terminal 110 and binding bar 410.

If a large amount of condensed water remains on the upper surface 121 side of housing 120 when the condensed water is adhered to housing 120 of battery cell 100, the condensed water can be a factor of forming an unintended electrical condition path between electrode terminal 110 and binding bar 410.

On the other hand, in battery module 1 according to the present embodiment, since protrusion 210 is not provided in separator member 200 at position A located on the upper side in the Z axis direction, the condensed water on the upper surface 121 side is facilitated to flow down to the lower surface 122 side along third side surface 125. As a result, a large amount of condensed water is suppressed from remaining near upper surface 121, thereby suppressing formation of an unintended electrical condition path between electrode terminal 110 and binding bar 410.

At position B located on the lower side in the Z axis direction, protrusion 210 is formed at separator member 200, and sealing member 430 is compressed more strongly. Thus, air leakage from sealing member 430 on the lower side can be more effectively suppressed, thereby improving cooling efficiency of battery module 1. On the other hand, at position B, the condensed water having flowed down along third side surface 125 is likely to be accumulated; however, since position B is distant away from electrode terminal 110, formation of an unintended electrical condition path between electrode terminal 110 and binding bar 410 is still suppressed even if a relatively large amount of condensed water remains at this position.

Although the embodiments of the present invention have been described and illustrated in detail, it is clearly understood that the same is by way of illustration and example only and is not to be taken by way of limitation, the scope of the present invention being interpreted by the terms of the appended claims. The scope of the present invention is defined by the terms of the claims, and is intended to include any modifications within the scope and meaning equivalent to the terms of the claims.

What is claimed is:

1. A battery module comprising:
   a plurality of battery cells arranged in a first direction;
   a separator provided between the plurality of battery cells; and
   a restraint member that restrains the plurality of battery cells in the first direction, wherein
   each of the plurality of battery cells includes two electrode terminals arranged side by side along a second direction orthogonal to the first direction, and a housing having an upper surface and a lower surface facing each other along a third direction orthogonal to the first direction and the second direction, and the two electrode terminals are provided on the upper surface of the housing,
   a protrusion is formed to protrude from the separator to a side opposite to the plurality of battery cells along the second direction,
   the restraint member includes a binding bar extending in the first direction, and an abutment member located on the plurality of battery cells side with respect to the binding bar, the abutment member being in abutment with the separator at a first position and a second position to form an air flow path between the first position and the second position, the first position and the second position being separated from each other along the third direction,
   the first position is located on a side close to the upper surface of the housing with respect to the second position, and
   the protrusion is disposed only at the second position of the first position and the second position, and is provided to interfere with the abutment member at the second position so as to compress and deform the abutment member.

2. The battery module according to claim 1, wherein the protrusion is formed in one piece with the separator.

3. The battery module according to claim 1, wherein the abutment member has a water absorption function.

4. The battery module according to claim 1, wherein
   the protrusion is formed in one piece with the separator, and
   the abutment member has a water absorption function.

5. The battery module according to claim 1, wherein
   the housing includes a case main body that accommodates an electrode assembly, and a sealing plate that seals an opening of the case main body,
   the first position is located in a vicinity of a joining portion of the sealing plate to the case main body, and
   the second position is located in a vicinity of the lower surface of the housing.

6. The battery module according to claim 1, wherein
   the protrusion is formed in one piece with the separator,
   the housing includes a case main body that accommodates an electrode assembly, and a sealing plate that seals an opening of the case main body,
   the first position is located in a vicinity of a joining portion of the sealing plate to the case main body, and
   the second position is located in a vicinity of the lower surface of the housing.

7. The battery module according to claim 1, wherein
   the abutment member has a water absorption function,
   the housing includes a case main body that accommodates an electrode assembly, and a sealing plate that seals an opening of the case main body,
   the first position is located in a vicinity of a joining portion of the sealing plate to the case main body, and
   the second position is located in a vicinity of the lower surface of the housing.

8. The battery module according to claim 1, wherein
   the protrusion is formed in one piece with the separator,
   the abutment member has a water absorption function,
   the housing includes a case main body that accommodates an electrode assembly, and a sealing plate that seals an opening of the case main body,
   the first position is located in a vicinity of a joining portion of the sealing plate to the case main body, and
   the second position is located in a vicinity of the lower surface of the housing.

9. The battery module according to claim 1, wherein the abutment member is composed of an insulating resin.

10. The battery module according to claim 1, wherein
    the protrusion is formed in one piece with the separator, and
    the abutment member is composed of an insulating resin.

11. The battery module according to claim 1, wherein
    the abutment member has a water absorption function, and
    the abutment member is composed of an insulating resin.

12. The battery module according to claim 1, wherein
    the housing includes a case main body that accommodates an electrode assembly, and a sealing plate that seals an opening of the case main body, the first position is located in a vicinity of a joining portion of the sealing plate to the case main body, the second position is located in a vicinity of the lower surface of the housing, and the abutment member is composed of an insulating resin.

13. The battery module according to claim 1, wherein the protrusion has an electrical insulation property.

14. The battery module according to claim 1, wherein the protrusion is formed in one piece with the separator, and the protrusion has an electrical insulation property.

15. The battery module according to claim 1, wherein the abutment member has a water absorption function, and the protrusion has an electrical insulation property.

16. The battery module according to claim 1, wherein the housing includes a case main body that accommodates an electrode assembly, and a sealing plate that seals an opening of the case main body, the first position is located in a vicinity of a joining portion of the sealing plate to the case main body, the second position is located in a vicinity of the lower surface of the housing, and the protrusion has an electrical insulation property.

17. The battery module according to claim 1, wherein the abutment member is composed of an insulating resin, and the protrusion has an electrical insulation property.

* * * * *